May 23, 1961   L. E. QUINTINO ET AL   2,985,811
CURRENT CONTROL APPARATUS
Filed Jan. 15, 1959   2 Sheets-Sheet 2

United States Patent Office 2,985,811
Patented May 23, 1961

2,985,811

CURRENT CONTROL APPARATUS

Luis E. Quintino, Buffalo, Paul E. Jacobs, Williamsville, and Loren F. Stringer, Clarence, N.Y., assignors to Westinghouse Electric Corporation, East Pittsburgh, Pa., a corporation of Pennsylvania Filed Jan. 15, 1959, Ser. No. 787,009

10 Claims. (Cl. 318—513)

The present invention relates in general to current control apparatus, and more particularly to current control apparatus operative with a motor having a field winding and for controlling the field current of that motor.

It is an object of the present invention to provide improved current control apparatus responsive to a predetermined operation condition of a current utilizing device, such as a motor for better controlling the operation of that motor.

It is an additional object of the present invention to provide improved current control apparatus for better controlling the operation of a motor by better controlling the current in a control or field winding of that motor.

It is a further object of the present invention to provide improved current control apparatus operative to control the current in a current utilizing device such as the field winding of a motor, and such that this current is held substantially constant at a predetermined value during a first condition, such as the starting operation of the motor, and is prevented from falling below a predetermined minimum value during a second condition, such as the running operation of the motor.

These and other objects of the present invention will become still more apparent from a study of the following description, taken in conjunction with the drawings, wherein.

Figure 1:
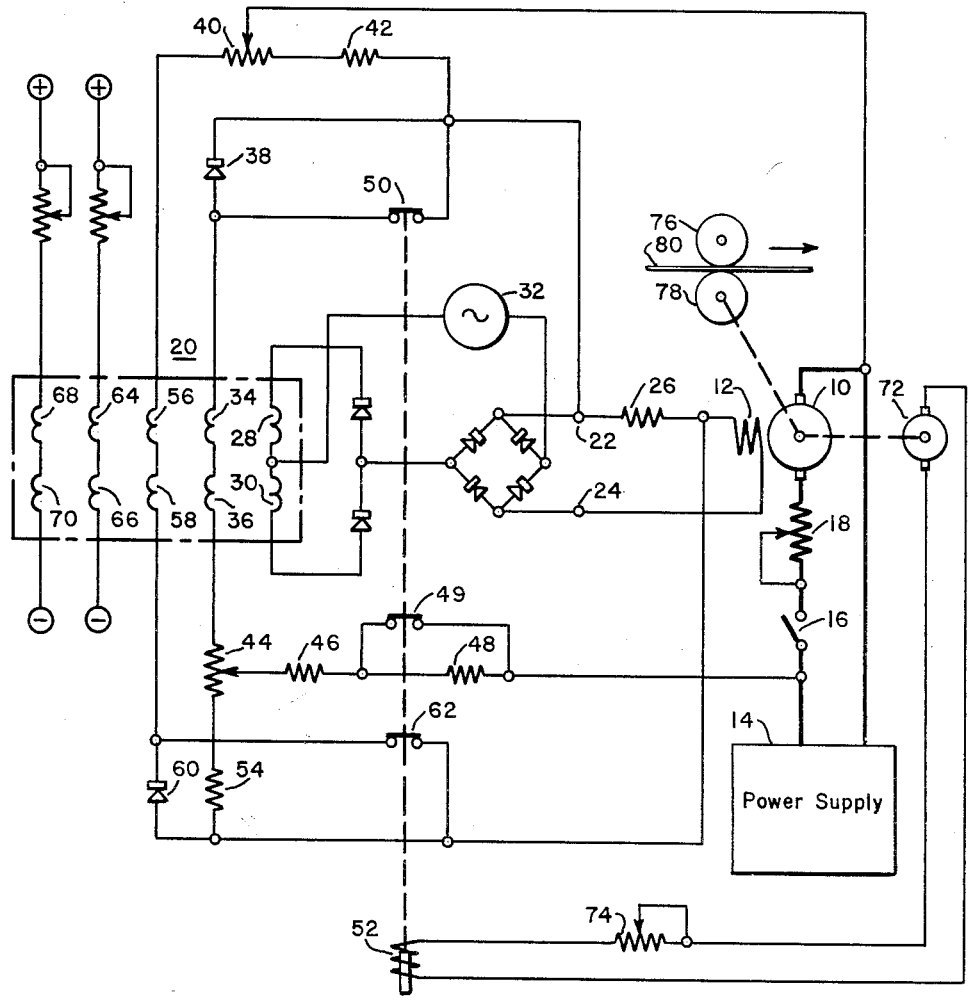
Figure 1 shows a schematic circuit arrangement of the current control apparatus in accordance with the present invention.

In Figure 1 there is shown a motor 10 having a control field winding 12. The motor 10 is connected for having its armature energized from a power supply 14 through a starting control switch 16 and an armature current controlling impedance member 18. The field winding 12 is connected to be energized by the output signal of a magnetic amplifier device 20, having output terminals 22 and 24, connected across said field winding 12 through an impedance member 26. The magnetic amplifier device 20 may be of the conventional and well known push-pull type, as well known to persons skilled in the present art. The magnetic amplifier device has a first pair of load windings 28 and 30 connected to be energized by an alternating current source 32. A first pair of control windings 34 and 36 are connected to be energized through a unidirectionally conductive device 38 by a first circuit arrangement including the power supply 14, a portion of an impedance member 40 and an impedance member 42, a portion of another impedance member 44, an impedance member 46, and an impedance member 48. The control windings 34 and 36 are energized by the output signal from the terminals 22 and 24 of the magnetic amplifier device 20 through a second circuit arrangement including the unidirectionally conductive device 38 shunted by a switch member 50 of a relay device 52, the impedance member 44 and an impedance member 54 and the motor field winding 12. A second pair of control windings 56 and 58 are connected to be energized by the power supply 14 through a portion of the impedance member 40 and a unidirectionally conductive device 60, the impedance member 54, a portion of the impedance member 44, the impedance member 46 and the impedance member 48. The second pair of control windings 56 and 58 is also connected to be energized by the output signal from the terminals 22 and 24 of the magnetic amplifier device 20, through the impedance member 40 and the impedance member 42, through the unidirectionally conductive member 60 as shunted by a switch member 62 operative with the relay device 52 and the motor field winding 12.

A pair of additional control windings 64 and 66 are provided on the magnetic amplifier device 20 for the purpose of controlling the energization of the field winding 12, as may be desired, and a pair of bias windings 68 and 70 may be provided on the magnetic amplifier device 20, as well known to persons skilled in this particular art.

The relay device 52 is connected to be energized by a signal providing means, such as a pilot generator 72 operatively connected to the motor 10, for providing an output signal in accordance with a predetermined operation of the motor 10, such as a predetermined operating speed of the motor. The output signal from the pilot generator 72 is operative through a variable impedance member 74 for operating the relay device 52 at some predetermined operation condition of the motor, such as motor speed.

The motor 10 may be connected to control the operation of a pair of roller members 76 and 78 operative with a sheet or the like of paper 80, for removing moisture from paper 80 by a squeezing operation.

The impedance member 48 may be shunted by a switch member 49 operative with the relay device 52.

Figure 2:
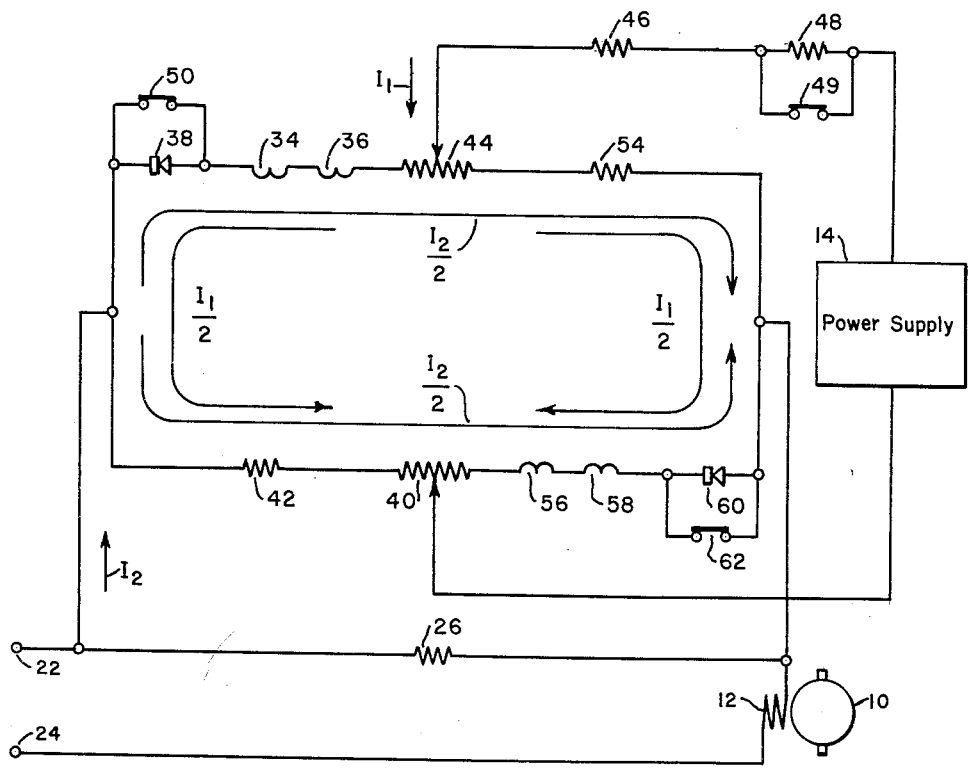
Fig. 2 shows schematic showing of the present control apparatus, arranged to more clearly illustrate the operative principles of the present control apparatus.

The schematic circuit showing in Fig. 2 is substantially the same current control circuit as shown in Fig. 1, with the circuit elements rearranged to more clearly illustrate the operation of the current control apparatus in accordance with the present invention.

The present control apparatus is operative for regulating the current flowing through the field winding 12 of the motor 10 for providing a predetermined and desired motor output. The present current control apparatus is operative to prevent the field current from falling below a predetermined minimum value during either starting or running operation of the motor 10.

During the starting operation of the motor 10 the relay device 52 is not energized by the pilot generator 72 sufficiently to operate, such that the switch members 49, 50 and 62 are in their normally closed positions. The current flow $I_1$ shown in Fig. 2 from the power supply or direct current voltage source 14 flows through the impedance members 46 and 48, and then divides into a pair of branch circuits with one-half of the current $I_1/2$ flowing through a first branch circuit including the portion of the impedance member 44, the control windings 34 and 36, the unidirectional conductive device 38, the impedance member 42, and a portion of the impedance member 40, and a second branch circuit through which the current $I_1/2$ flows includes the other portion of the impedance member 44, the impedance member 54, the unidirectionally conductive diode device 60, the control windings 56 and 58, and the other portion of the impedance member 40.

Relative to the output signal of the magnetic amplifier device 20, as supplied from the terminals 22 and 24, the signal current from the magnetic amplifier device in the form of a current $I_2$ flows through a first series circuit in the form of a current $I_2/2$ and including the now closed contact or switch member 50, the control windings 34 and 36, the impedance member 44, and the impedance member 54. Similarly, through a second series of circuit one-half the current $I_2$ or $I_2/2$ flows through an impedance member 42, the impedance member 40, the control windings 56 and 58, and the now closed switch member 62. The latter first and second series circuits are connected in series with the field winding 12, relative to the current flow from the terminals 22 and 24.

In this regard, the component values of the impedance members and the effective impedance of the control windings involved are such that the current $I_1$ from the power supply 14 equally divides between the first and second branch circuits and similarly, the current $I_2$ from the magnetic amplifier device 20 equally divides through the first and second series circuits. Further, it should be noted that $I_1/2$ substantially equals $I_2/2$ and relative to the control windings 34 and 36, the current $I_1/2$ flows in a first direction through the unidirectionally conductive device 38, and the current $I_2/2$ from the magnetic amplifier device 20 flows in the opposite direction, such that relative to energizing the control windings 34 and 36 there is no net energization of these control windings. The operation is similar, relative to the control windings 56 and 58.

However, if the output current from the magnetic amplifier device 20 decreases in value, then the current component $I_2/2$, which flows through the control windings 34 and 36, will be less than the current component $I_1/2$ which flows in the opposite direction through the control windings 34 and 36 such that the net energization of the control windings 34 and 36 will be in a direction to effectively increase the output current flow from the magnetic amplifier device 20. Similarly, relative to the control windings 56 and 58, should the output current from the magnetic amplifier device 20 decrease in value, there will be a net energization by the now greater current component $I_1/2$ from the power supply 14 to result in the control windings 56 and 58 being energized to cause the output current from the magnetic amplifier device 20 to effectively increase in value.

Similarly, should the output signal from the magnetic amplifier device increase in value, it will result in a net energization of the control windings 34 and 36 as well as the control windings 56 and 58 by the now greater current component $I_2/2$, such that the output current from the magnetic amplifier device will be decreased in value.

In this manner, the energization current flowing through the control field winding 12 of the motor 10 is maintained substantially constant during the starting operation of the motor 10.

When the motor 10 has reached some predetermined operating speed, such that it can be considered to be in its running condition of operation, the output signal from the pilot generator 72 and passing through the impedance member 74 can be made adequate to energize the relay device 52 such that the switch members 49, 50 and 62 are now opened. Now the current flow component $I_1/2$ from the power supply 14 can flow through the control windings 36 and 34, and through the unidirectionally conductive device 38, as will the similar current component $I_1/2$ from the power supply 14, can flow through the unidirectionally conductive device 60 to energize the control windings 56 and 58 of the magnetic amplifier device 20. However, the output current component $I_2/2$ from the magnetic amplifier device 20 is blocked by the unidirectionally conductive device 38 from flowing through the control windings 34 and 36, and this similar current component is similarly blocked by the unidirectionally conductive device 60 from flowing through the control windings 56 and 58.

However, if the output signal from the magnetic amplifier device 20 falls below a predetermined value as determined by the magnitudes of the various circuit elements involved, then there will be a net voltage difference across the control windings 34 and 36 to result in a net energization of the control windings 34 and 36 by the current $I_1/2$ from the power supply 14 such that the output signal of the magnetic amplifier device 20 is thereby increased in value. Similarly, the control windings 56 and 58 are operative such that when the output signal of the magnetic amplifier device 20 falls below a predetermined value, there is a net energization by the current $I_1/2$ from the power supply 14 of the control windings 56 and 58 to effectively increase the output current or signal from the magnetic amplifier device 20.

When the output current from the magnetic amplifier device 20 increases in value, there is no resulting net energization of the control windings 34 and 36 as well as the control winding 56 and 58, due to the respective blocking unidirectionally conductive devices or diodes 38 and 60. Therefore, it can be seen that during running operation of the motor 10, the current of the motor field winding 12 cannot drop below a predetermined value as determined by the values of the impedance members used in the circuit arrangement of the present control apparatus. However, the present control apparatus is not operative to restrict the upper value of the energization current which can flow through the control field winding 12.

Figure 3:
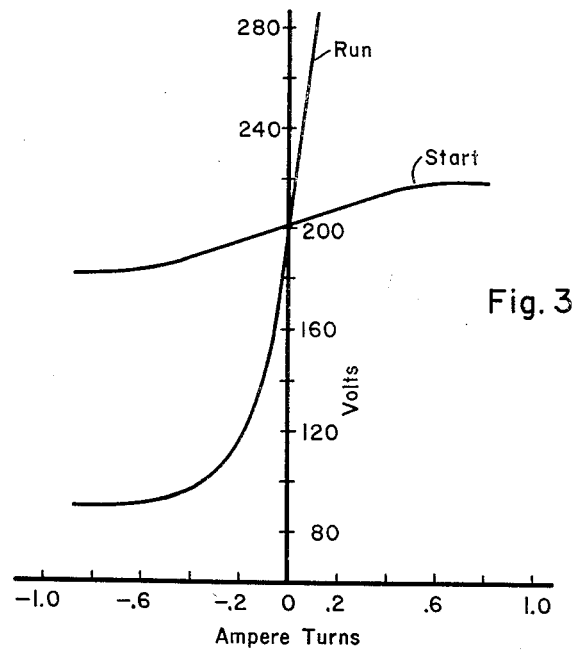
Fig. 3 shows a curve chart illustrating the operation of the present control apparatus.

In Fig. 3, the curve chart illustrates the output of the magnetic amplifier device 20, plotted as a function of ampere turns, for an actual and practical application of the present current control apparatus for controlling the energization current of the field winding of a direct current motor 10, which motor may run away in its operation if the field current becomes too low in value. The following actual values of the respective circuit elements have been utilized and proven to be satisfactorily operative in this regard: For the impedance member 26, 12 ohms; For the impedance member 40, 11 ohms on either side of the variable contactor with a total of 22 ohms; For the impedance member 44, 11 ohms on either side of the variable contactor with a total of 22 ohms; For the impedance member 46, 300 ohms; For the impedance member 48, 300 ohms; For the impedance member 42, 6 ohms; For the impedance member 54, 6 ohm; For the effective impedance of the control windings 34 and 36 together, 6 ohms; For the effective impedance of the control windings 56 and 58 together, 6 ohms; The power supply 14, 250 volts D.C.; and The power supply 32, 275 volts at 400 cycles.

It should be readily apparent that the impedance member 48 and its shunting switch member 49 could be removed from the circuit arrangement shown in Figs. 1 and 2 without materially affecting the operation of the subject current control apparatus. As presently shown it provides a different level of current control operation for the motor starting condition.

It should be understood that a single control winding could be substituted for the pair of control windings 34 and 36, as well as a single winding substituted for the pair of windings 56 and 58, if desired. This may improve the magnetic coupling to the pair of load windings in that the single winding would then be common to each of the load windings.

Although the present invention has been described with a certain degree of particularity, it should be understood that the present disclosure has been made only by way of example, and that numerous changes in the details of construction and the combination and arrangement of parts may be resorted to without departing from the scope and spirit of the invention.

We claim as our invention:

1. In current control apparatus operative with a source of control voltage and a load device having a control member, the combination of a current control device having at least first and second control windings, a first impedance member connected in a first series circuit with said first control winding, a second impedance member connected in a second series circuit with said second control winding, with each of said first and second series circuits being connected to supply current to said control member, with said first control winding and said second impedance member being connected in series across said voltage source and with said second control winding and said first impedance member being connected in series across said voltage source.

2. In current control apparatus operative with a source of direct current voltage and a load device having a control member, the combination of a magnetic amplifier device having at least first and second control windings, a first branch circuit including a first impedance member and said first control winding, a second branch circuit including a second impedance member and said second control winding, with each of said first and second branch circuits being connected in series with said control member, and with said first impedance member and said second control winding being connected in series across said voltage source and said second impedance member and said first control winding being connected in series across said voltage source.

3. In current control apparatus operative with a source of direct current voltage for controlling a load device having a control element, the combination of a current control device having at least first and second control windings, a first unidirectionally conductive control member, a second unidirectionally conductive control member, a first impedance member connected in a first series circuit with said first control winding and said first control member, a second impedance member connected in a second series circuit with said second control winding and said second control member, with each of said first and second series circuits being connected to supply current to said control element, said first control winding and said first impedance member being connected in series across said voltage source, and said second control winding and said first impedance member being connected in series across said voltage source.

4. In current control apparatus operative with a source of control voltage and a load device having a load control winding, a combination of a current control device having at least first and second control windings, a first current control member connected in a first series circuit with said first control winding, a second current control member connected in a second series circuit with said second control winding, with each of said first and second series circuits being connected to supply current to said load control winding, said first control winding and said first current control member being connected in series across said voltage source and said second control winding and said first current control member being connected in series across said voltage source, a relay device having at least first and second switch members, said first switch member being connected to shunt said first current control member and said second switch member being connected to shunt said second current control member, signal providing means operatively connected to said load device for providing an output signal in accordance with a predetermined operation of said load device, with said relay device being operatively connected to said signal providing means for opening said first and second switch members in response to said output signal.

5. In current control apparatus operative with a source of control voltage and a load device having a load controlling winding, a combination of a current control device having at least first and second control windings, a first impedance member connected in a first series circuit with said first control winding, a second impedance member connected in a second series circuit with said second control winding, with each of said first and second series circuits being connected to supply current to said load controlling winding, with said first control winding and said second impedance member being connected in series across said voltage source and said second control winding and said first impedance member being connected in series across said voltage source, said current control device having output terminals connected to supply an output signal to energize said load controlling winding and to energize each of said first and second control windings such that if the output signal of said current control device increases said voltage source will cause said control windings to be energized such that the output signal from said current control device is effectively decreased in value and if the said output signal from the current control device decreases said voltage source will energize said first and second control windings such that said output signal from the current control device is effectively increased.

6. In current control apparatus operative with a source of control voltage and a motor having a motor control winding, the combination of a magnetic amplifier device having at least first and second control windings, a first impedance member connected in a first series circuit with said first control winding, a second impedance member connected in a second series circuit with said second control winding, with each of said first and second series circuits being connected to supply current to said motor control winding, with said first control winding and said second impedance member being connected in series across said voltage source and with said second control winding and said first impedance member being connected in series across said voltage source.

7. In current control apparatus operative with a source of direct current voltage and a direct current motor device having a field winding, the combination of a current control device having at least first and second control windings, a first branch circuit including a first impedance member and said first control winding, a second branch circuit including a second impedance member and said second control winding, with each of said first and second branch circuits being connected in series with said field winding, and with said first impedance member and said second control winding being connected in series across said voltage source and said second impedance member and said first control winding being connected in series across said voltage source.

8. In current control apparatus operative with a source of direct current voltage for controlling a motor having a field winding, the combination of a magnetic amplifier device having at least first and second control windings, a first unidirectionally conductive control member, a second unidirectionally conductive control member, a first impedance member connected in a first series circuit with said first control winding and said first control member, a second impedance member connected in a second series circuit with said second control winding and said second control member, with each of said first and second series circuits being connected to supply current to said field winding, said first control winding and said first impedance member being connected in series across said voltage source, and said second control winding and said first impedance member being connected in series across said voltage source.

9. In current control apparatus operative with a source of control voltage and a motor having a field winding, a combination of a magnetic amplifier device having at least first and second control windings, a first current control member connected in a first series circuit with said first control winding, a second current control member connected in a second series circuit with said second control winding, with each of said first and second series circuits being connected to supply current to said field winding, said first control winding and said first current control member being connected in series across said voltage source and said second control winding and said first current control member being connected in series across said voltage source, a relay device having at least first and second switch members, said first switch member being connected to shunt said first current control member and said second switch member being connected to shunt said second current control member, signal providing means operatively connected to said motor for providing an output signal in accordance with a predetermined operation of said motor, with said relay device being operatively connected to said signal providing means for opening said first and second switch members in response to said output signal.

10. In current control apparatus operative with a source of control voltage and a motor having a field winding, a combination of a magnetic amplifier device having at least first and second control windings, a first impedance member connected in a first series circuit with said first control winding, a second impedance member connected in a second series circuit with said second control winding, with each of said first and second series circuits being connected to supply current to said field winding, with said first control winding and said second impedance member being connected in series across said voltage source and with said second control winding and said first impedance member being connected in series across said voltage source, said magnetic amplifier device having output terminals connected to supply an output signal to energize said motor field winding and to energize each of said first and second control windings such that if the output signal of said magnetic amplifier device increases above a predetermined value said voltage source will cause said control windings to be energized such that the output signal from said magnetic amplifier device is effectively decreased in value and if the said output signal from the magnetic amplifier device decreases said voltage source will energize said first and second control windings such that said output signal from the magnetic amplifier device is effectively increased.

References Cited in the file of this patent
UNITED STATES PATENTS

| | | |
|---|---|---|
| 2,792,547 | Horton et al. | May 14, 1957 |
| 2,800,626 | Bastian | July 23, 1957 |
| 2,882,477 | King et al. | Mar. 14, 1959 |